(12) United States Patent
Ding

(10) Patent No.: US 10,999,336 B2
(45) Date of Patent: May 4, 2021

(54) COMMUNICATION SYSTEM AND CONSTRUCTION METHOD AND COMMUNICATION METHOD THEREOF

(71) Applicant: BOE TECHNOLOGY GROUP CO., LTD., Beijing (CN)

(72) Inventor: Shasha Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 41 days.

(21) Appl. No.: 16/414,906

(22) Filed: May 17, 2019

(65) Prior Publication Data

US 2020/0021628 A1 Jan. 16, 2020

(30) Foreign Application Priority Data

Jul. 13, 2018 (CN) .......................... 201810771856.7

(51) Int. Cl.
*H04L 12/18* (2006.01)
*H04M 3/42* (2006.01)
*H04L 29/06* (2006.01)

(52) U.S. Cl.
CPC ........ *H04L 65/403* (2013.01); *H04L 12/1822* (2013.01); *H04L 65/1053* (2013.01); *H04M 3/42314* (2013.01)

(58) Field of Classification Search
None
See application file for complete search history.

(56) References Cited

U.S. PATENT DOCUMENTS

| 7,539,494 | B2 * | 5/2009 | Idnani | ............... | H04L 29/06027 |
| | | | | | 370/216 |
| 2005/0058088 | A1 * | 3/2005 | Decker | ................. | H04M 7/006 |
| | | | | | 370/260 |
| 2007/0258573 | A1 * | 11/2007 | Lowmaster | ......... | H04M 3/4234 |
| | | | | | 379/220.01 |

(Continued)

FOREIGN PATENT DOCUMENTS

| CN | 1585436 | 2/2005 |
| CN | 1725851 | 1/2006 |

(Continued)

OTHER PUBLICATIONS

Chinese Office Action dated Apr. 20, 2020 corresponding to Chinese Patent Application No. 2018107718567; 30 pages.

*Primary Examiner* — Joshua Joo
(74) *Attorney, Agent, or Firm* — Leason Ellis LLP

(57) ABSTRACT

A communication system, and a construction method and a communication method thereof are provided. The communication system includes a relay server and a plurality of communication nodes. The relay server is in signal connection with the plurality of communication nodes, the plurality of communication nodes respectively store routing links for connection to the relay server, and the relay server stores routing links respectively corresponding to the plurality of communication nodes. The plurality of communication nodes are in signal connection with a plurality of groups of terminals in one-to-one correspondence. The relay server provides communication connections for terminals connected to different communication nodes.

7 Claims, 4 Drawing Sheets

(56) References Cited

U.S. PATENT DOCUMENTS

| | | | | |
|---|---|---|---|---|
| 2008/0075266 A1* | 3/2008 | Yang | ........................ | H04Q 3/62 |
| | | | | 379/233 |
| 2009/0040948 A1* | 2/2009 | Wengrovitz | ............ | H04M 3/56 |
| | | | | 370/260 |
| 2010/0195642 A1* | 8/2010 | Terpstra | .............. | H04M 7/0075 |
| | | | | 370/352 |
| 2011/0149809 A1* | 6/2011 | Narayanaswamy | ......................... | |
| | | | | G06Q 10/1095 |
| | | | | 370/260 |
| 2012/0069754 A1 | 3/2012 | Marsh et al. | | |
| 2014/0119240 A1* | 5/2014 | Lopez | .................. | H04Q 3/0045 |
| | | | | 370/259 |
| 2015/0026601 A1* | 1/2015 | Baccay | ............... | G06F 3/04842 |
| | | | | 715/753 |
| 2017/0085596 A1* | 3/2017 | Hopson, III | ........ | H04L 65/1053 |

FOREIGN PATENT DOCUMENTS

| | | |
|---|---|---|
| CN | 1848876 | 10/2006 |
| CN | 1937681 | 3/2007 |
| CN | 1309238 | 4/2007 |
| CN | 101159788 | 4/2008 |
| CN | 101772947 | 7/2010 |
| CN | 101902536 | 12/2010 |
| CN | 102045465 | 5/2011 |
| CN | 102934409 | 2/2013 |
| CN | 103780402 | 5/2014 |
| CN | 203788420 | 8/2014 |
| CN | 104284033 | 1/2015 |
| CN | 102833437 | 12/2019 |
| CN | 101742010 | 6/2020 |
| EP | 1791338 | 5/2007 |

\* cited by examiner

COMMUNICATION SYSTEM AND CONSTRUCTION METHOD AND COMMUNICATION METHOD THEREOF

CROSS REFERENCE TO RELATED APPLICATIONS

The present application claims priority of Chinese Patent Application No. 201810771856.7 filed on Jul. 13, 2018, the disclosure of which is incorporated herein by reference in its entirety as part of the present application.

TECHNICAL FIELD

Embodiments of the present disclosure relate to a communication system, and a construction method and a communication method thereof.

BACKGROUND

Telephone private branch exchanges (PBXs) are widely used in all industries as a necessary communication means inside enterprises. For example, inside the enterprises, communications between fixed-line telephones can be implemented by directly dialing up a short number through the PBX, so that the dial-up operation is simplified while communication cost of the enterprises can be saved.

SUMMARY

At least one embodiment of the present disclosure provides a communication system, which comprises a relay server and a plurality of communication nodes. The relay server is in signal connection with the plurality of communication nodes, the plurality of communication nodes respectively store routing links for connection to the relay server, and the relay server stores routing links respectively corresponding to the plurality of communication nodes; the plurality of communication nodes are in signal connection with a plurality of groups of terminals in one-to-one correspondence; and the relay server provides communication connections for terminals connected to different communication nodes.

For example, the communication system provided by an embodiment of the present disclosure further comprises the plurality of groups of terminals, and each group in the plurality of groups of terminals comprises at least one terminal.

For example, in the communication system provided by an embodiment of the present disclosure, the relay server and the plurality of communication nodes are registered with session initiation protocol routing.

For example, in the communication system provided by an embodiment of the present disclosure, the relay server is registered to the plurality of communication nodes with a first code, each of the plurality of communication nodes is respectively registered to the relay server with a second code, different communication nodes correspond to different second codes, each terminal in the plurality of groups of terminals is respectively registered to a communication node correspondingly connected to the terminal with a terminal tail number, and different terminals correspond to different terminal tail numbers.

For example, in the communication system provided by an embodiment of the present disclosure, the plurality of groups of terminals comprise a first terminal and a second terminal, which are respectively connected to different communication nodes, the first terminal serves as a calling terminal, and the second terminal serves as a called terminal, or the first terminal serves as the called terminal, and the second terminal serves as the calling terminal, and the calling terminal communicates with the called terminal by sequentially dialing up the first code, a second code corresponding to a communication node connected to the called terminal, and a terminal tail number of the called terminal.

For example, in the communication system provided by an embodiment of the present disclosure, the relay server stores the routing links respectively corresponding to the plurality of communication nodes in a routing table of the relay server.

For example, in the communication system provided by an embodiment of the present disclosure, a digit number of the terminal tail number is determined according to a number of terminals which the plurality of groups of terminals comprise.

For example, in the communication system provided by an embodiment of the present disclosure, the communication nodes comprise private branch exchanges, the terminals comprise fixed-line telephones, each of the fixed-line telephones is capable of serving as the calling terminal or the called terminal, terminal tail numbers corresponding to the fixed-line telephones are tail numbers of telephone numbers of the fixed-line telephones, and the relay server provides a one-to-one communication connection for fixed-line telephones connected to two different private branch exchanges.

For example, in the communication system provided by an embodiment of the present disclosure, the communication nodes further comprise video meeting servers, the terminals further comprise virtual meeting rooms, the virtual meeting rooms are in signal connection with the video meeting servers, each of the virtual meeting rooms is capable of serving as the called terminal, terminal tail numbers corresponding to the virtual meeting rooms are meeting room numbers of the virtual meeting rooms, and the relay server provides a many-to-one meeting communication for fixed-line telephones connected to different private branch exchanges, utilizing the virtual meeting rooms.

For example, in the communication system provided by an embodiment of the present disclosure, the relay server is connected to the plurality of communication nodes through a network.

At least one embodiment of the present disclosure further provides a construction method of a communication system, and the construction method comprises: connecting, in signal, a relay server to a plurality of communication nodes; storing routing links for connection to the relay server in the plurality of communication nodes respectively, and storing routing links respectively corresponding to the plurality of communication nodes in the relay server; and connecting, in signal, the plurality of communication nodes to a plurality of groups of terminals in one-to-one correspondence; and each group in the plurality of groups of terminals comprises at least one terminal.

For example, the construction method provided by an embodiment of the present disclosure further comprises: registering the relay server and the plurality of communication nodes with session initiation protocol routing.

For example, in the construction method provided by an embodiment of the present disclosure, registering the relay server and the plurality of communication nodes with the session initiation protocol routing comprises: registering the relay server to the plurality of communication nodes with a first code; and registering each of the plurality of communication nodes to the relay server with a second code respectively; and different communication nodes correspond to different second codes.

For example, the construction method provided by an embodiment of the present disclosure further comprises: registering each terminal in the plurality of groups of terminals to a communication node correspondingly connected to the terminal with a terminal tail number respectively; and different terminals correspond to different terminal tail numbers.

For example, the construction method provided by an embodiment of the present disclosure further comprises: respectively using terminals connected to different communication nodes as a calling terminal and a called terminal of the communication system; and the calling terminal communicates with the called terminal by sequentially dialing up the first code, a second code corresponding to a communication node connected to the called terminal, and a terminal tail number of the called terminal.

For example, in the construction method provided by an embodiment of the present disclosure, the relay server stores the routing links respectively corresponding to the plurality of communication nodes in a routing table of the relay server, and the relay server and the plurality of communication nodes constitute a star-shaped network where the relay server is a center.

At least one embodiment of the present disclosure further provides a communication method utilizing the communication system described above, the communication method is used for enabling the fixed-line telephones connected to two different private branch exchanges to carry out communication, the fixed-line telephones connected to two different private branch exchanges comprise a calling fixed-line telephone and a called fixed-line telephone, and the communication method comprises: the calling fixed-line telephone dialing up the first code to connect to the relay server through a private branch exchange connected to the calling fixed-line telephone; the calling fixed-line telephone dialing up a second code corresponding to a private branch exchange connected to the called fixed-line telephone to connect to the private branch exchange connected to the called fixed-line telephone through the relay server; and the calling fixed-line telephone dialing up a tail number of a telephone number of the called fixed-line telephone to connect with the called fixed-line telephone in the one-to-one communication connection.

At least one embodiment of the present disclosure further provides a communication method utilizing the communication system described above, the communication method is used for enabling fixed-line telephones used as calling fixed-line telephones and connected to different private branch exchanges to carry out communication with a virtual meeting room used as the called terminal, and the communication method comprises: at least one of the calling fixed-line telephones dialing up the first code to connect to the relay server through the private branch exchanges connected to the calling fixed-line telephones respectively; the at least one of the calling fixed-line telephones dialing up a second code corresponding to a video meeting server connected to the virtual meeting room to connect to the video meeting server connected to the virtual meeting room trough the relay server; and the at least one of the calling fixed-line telephones dialing up a meeting room number of the virtual meeting room to enter the virtual meeting room, so as to carry out the many-to-one meeting communication.

For example, in the communication method provided by an embodiment of the present disclosure, before the communication is carried out, the communication method further comprises: querying whether at least one video meeting server still has a virtual meeting room that is available according to preplanned meeting time, if yes, reserving the virtual meeting room that is available and returning reservation information, and if no, randomly selecting one video meeting server and, by the one video meeting server that is selected, allocating one virtual meeting room and returning the reservation information; and the reservation information comprises a second code corresponding to the video meting server connected to the virtual meeting room and a meeting room number of the virtual meeting room.

For example, in the communication method provided by an embodiment of the present disclosure, in a case where there is no virtual meeting room that is available corresponding to the meeting time, the communication method further comprises: searching a virtual meeting room that is available and is closest to the meeting time from at least one video meeting server, and reserving the virtual meeting room and returning the reservation information.

BRIEF DESCRIPTION OF THE DRAWINGS

In order to clearly illustrate the technical solutions of the embodiments of the disclosure, the drawings of the embodiments will be briefly described in the following; and it is obvious that the described drawings are only related to some embodiments of the disclosure and thus are not limitative to the disclosure.

Specific embodiments of the present disclosure will be further illustrated in detail in connection with the drawings.

DETAILED DESCRIPTION

Figure 1:
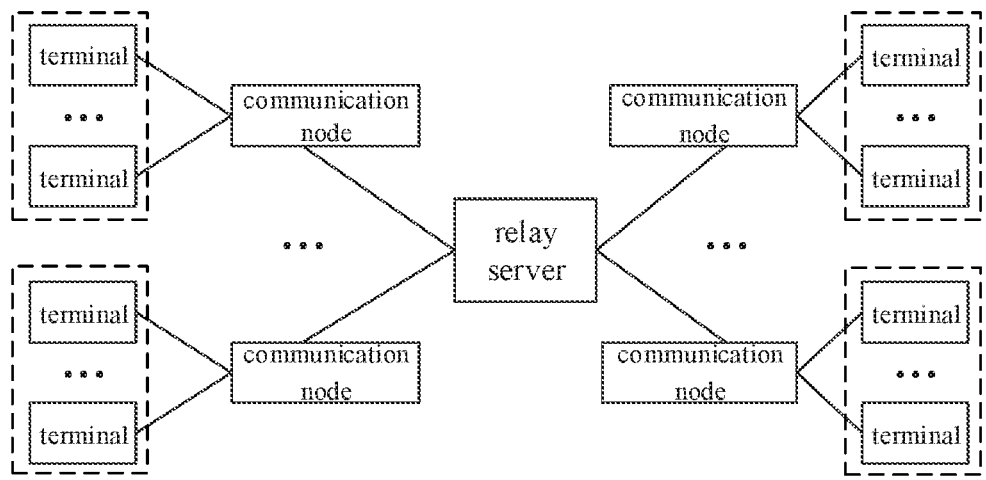
FIG. 1 is a block diagram of a communication system according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For a large enterprise with branches positioned in a plurality of different regions, communications among the branches in all the regions are carried out generally by a public switched telephone network (PSTN). For example, a certain enterprise has branch offices in Beijing, Shanghai, Shenzhen and Chengdu, a telephone PBX is respectively deployed in each branch office, but the telephone PBX is merely used for communications among internal extension sets of each branch office. In a case where a calling user of the Beijing branch office makes a call to a called user in the Shanghai branch office, the calling user needs to dial up an outgoing number of the Beijing branch office, an area code of Shanghai, and a telephone number of the called user, to implement communication, so that the code dial-up operation is complicated and the number is long, and moreover, the tariff is calculated according to the tariff standard of a long-distance call, so that communication cost is relatively high.

For the case of the complicated dial-up operation when telephone communication is carried out among different geographical areas by using fixed-line telephones inside the enterprise and the problem of relatively high communication cost caused by the telephone communication, at least one embodiment of the present disclosure provides a communication system, and a construction method and a communication method thereof. The communication system is based on a relay server and for example, used for communication among fixed-line telephones, solves the problem of complicated dial-up operation and overcomes the disadvantage for system capacity expansion of general telephone communication, effectively simplifies the communication operation of the fixed-line telephones among different geographical areas inside the enterprise for example, and obviously reduces communication cost.

As illustrated in FIG. 1, an embodiment of the present disclosure provides a communication system, and the communication system is based on a relay server and for example, used for communication among fixed-line telephones. The communication system includes a relay server and a plurality of communication nodes. The relay server is in signal connection with the plurality of communication nodes, the plurality of communication nodes respectively store routing links for connection to the relay server, and the relay server stores routing links respectively corresponding to the plurality of communication nodes. The plurality of communication nodes are in signal connection with a plurality of groups of terminals in one-to-one correspondence. The relay server provides communication connections for terminals connected to different communication nodes. For example, in some examples, the communication system further includes a plurality of groups of terminals, each group in the plurality of groups of terminals includes at least one terminal, and the plurality of communication nodes are in signal connection with the plurality of groups of terminals in one-to-one correspondence.

For example, in some examples, the relay server is connected to the plurality of communication nodes through a network, and the network, for example, is a PSTN, an internet or other applicable networks. The relay server and each communication node, for example, are registered with session initiation protocol (SIP) routing, the relay server stores the routing link corresponding to each communication node in a routing table of the relay server, for example, each communication node corresponds to one routing link, and the routing link can enable the relay server to connect to the corresponding communication node. It should be noted that in some embodiments of the present disclosure, a registration mode of the relay server and each communication node is not limited to SIP routing registration and may also adopt a random applicable registration mode, and the embodiments of the present disclosure are not limited thereto. The plurality of communication nodes respectively store routing links for connection to the relay server. For example, the relay server is registered to the plurality of communication nodes with a first code, and each of the plurality of communication nodes is respectively registered to the relay server with a second code. For example, different communication nodes correspond to different second codes, i.e., the plurality of communication nodes correspond to a plurality of second codes in one to one correspondence. Each communication node is connected to one group of terminals through the network, and the one group of terminals includes one or more terminals. Each terminal is registered to the communication node correspondingly connected to the terminal with a terminal tail number, and different terminals correspond to different terminal tail numbers. For example, any one terminal in the plurality of terminals may serve as a calling terminal, and any one terminal different from the calling terminal may serve as a called terminal. For example, the calling terminal and the called terminal are respectively connected to different communication nodes. The relay server provides communication connections for terminals connected to different communication nodes, and for example, the calling terminal implements communication, e.g., one-to-one communication, with the called terminal by sequentially dialing up the first code, a second code corresponding to a communication node connected to the called terminal, and a terminal tail number of the called terminal.

In some examples, the relay server is connected to the plurality of communication nodes through the network, and for example, the relay server can be connected to each communication node in a cross networking mode, but the cross networking mode makes the structure of the overall communication system relatively complex. Therefore, in this embodiment, the relay server and the plurality of communication nodes, for example, constitute a star-shaped network where the relay server is a center, so that the structure of the communication system can be simplified. It should be noted that in some embodiments of the present disclosure, the relay server and the plurality of communication nodes may also adopt any other applicable networking modes, it can be determined according to actual demands, and the embodiments of the present disclosure are not limited thereto.

The relay server and each communication node are registered with SIP routing for example, to acquire the routing links for connection to each other, i.e., the routing link for connection to each communication node is stored in the routing table of the relay server, each communication node also respectively stores the routing link for connection to the relay server, and communication between the relay server and each communication node is implemented through the routing links. In order to implement communication among each communication node in the communication system, the relay server further needs to be registered to the plurality of communication nodes with the first code, so that a plurality of terminals connected to each communication node can be directly connected to the relay server by dialing up the first code; and meanwhile, each communication node is respectively registered to the relay server with the second code which is in one-to-one correspondence with each communication node, so that the relay server identifies each communication node. One or more terminals are provided for each communication node, and each terminal is registered to the communication node to which the terminal belongs (i.e., the communication node connected to the terminal) with the terminal tail number, so that the communication node can identify each terminal by the terminal tail number.

For example, a logic processing program is operated in the relay server, and the logic processing program can implement signaling forwarding and audio/video processing forwarding, so as to implement interconnection of the accessed terminals. For example, a terminal connected to a communication node dials up the first code to establish a connection between the communication node and the relay server, and the logic processing program in the relay server carries out addressing in the routing table according to the second code further received and establishes a connection with the communication node corresponding to the second code according to an addressing result, so that a connection is established between the two communication nodes by the relay server. For example, the logic processing program may include one or more pieces of computer software, the computer software may be common software for implementing a response mechanism or software specially developed for the communication system, and the embodiments of the present disclosure are not limited thereto.

Therefore, the communication system can implement communication among each communication node on the basis of the relay server, for example, the relay server can carry out communication connection on two terminals respectively belonging to different communication nodes (i.e., respectively connected to different communication nodes), and for example, the calling terminal belonging to a communication node A carries out communication with the called terminal by sequentially dialing up the first code representing the relay server, the second code representing a communication node B to which the called terminal belongs, and the terminal tail number representing the called terminal.

A certain large enterprise in China is taken as an example for illustration, the enterprise has branch offices in Beijing, Shanghai, Shenzhen, Chengdu and the like, each branch office respectively has an internal communication node, and each communication node is provided with a plurality of terminals. Each terminal inside each branch office carries out mutual communication through the respective communication node, and the terminals among the branch offices carry out communication in a communication system established by the relay server for the fixed-line telephones, which is based on the relay server.

Figure 2:
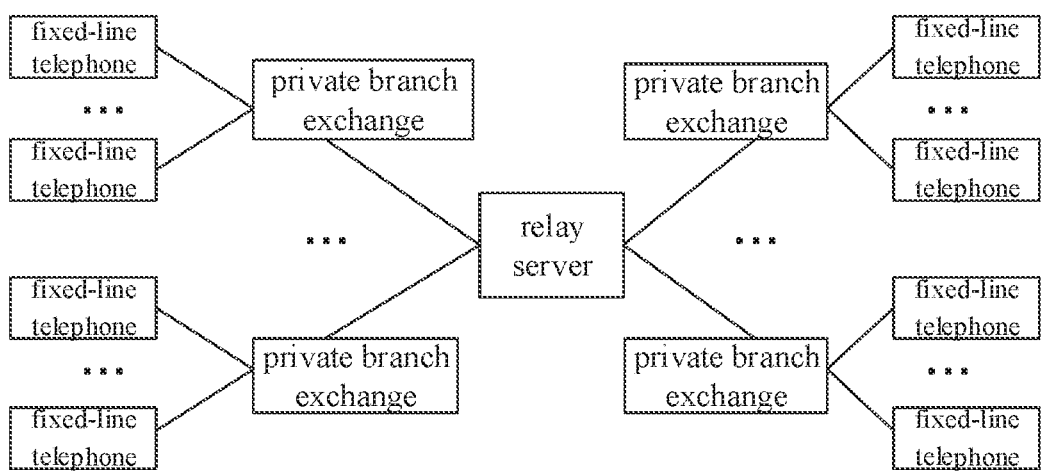
FIG. 2 is a block diagram of a communication system according to another embodiment of the present disclosure.

In some embodiments, as illustrated in FIG. 2, the communication nodes include PBXs, and the terminals include fixed-line telephones. A plurality of fixed-line telephones arranged under each PBX can respectively serve as calling terminals or called terminals, a terminal tail number is a tail number of a telephone number of each fixed-line telephone, and the relay server provides the one-to-one communication connection for the fixed-line telephones respectively belonging to two different PBXs (i.e., respectively connected to two different PBXs).

For example, the fixed-line telephone may include a video phone, an audio phone or the like. A plurality of accessed video phones may be different in screen size, and for example, may have a size of 200*100 or 100*100, and thus, the relay server can implement transformation of widths and lengths of video images of different video phones so as to match corresponding display screens. For example, in a case where a voice signal is transmitted, the voice signal can adopt various forms of audio coding modes, such as G711, G729 and the like, and the relay server can implement transformation on the voice signals in different coding modes so as to implement signal coding identification on different PBXs.

For example, branch offices of a certain enterprise in Beijing, Shanghai, Shenzhen, Chengdu and the like all have respective internal PBXs, each PBX is connected to a plurality of fixed-line telephones, each fixed-line telephone is registered to the PBX to which the fixed-line telephone belongs (i.e., the PBX connected to the fixed-line telephone) with a tail number of a telephone number, and the PBX identifies each fixed-line telephone by the tail number. Inside each branch office, communication is implemented among the fixed-line telephones by dialing up the tail numbers.

For two fixed-line telephones between the branch offices, relay connection is carried out by the relay server to implement communication, each fixed-line telephone can respectively serve as the calling terminal or the called terminal, and not only can make a call, but also can answer a call. For example, the calling fixed-line telephone dials up the first code to be connected to the relay server through the PBX to which the calling fixed-line telephone belongs; then the calling fixed-line telephone dials up the second code corresponding to the PBX connected to the called fixed-line telephone to be connected to the PBX to which the called fixed-line telephone belongs through the relay server; and then the calling fixed-line telephone dials up the tail number of the telephone number of the called fixed-line telephone, so as to carry out the one-to-one communication connection with the called fixed-line telephone.

In this embodiment, for example, the relay server can be arranged in any one branch office, and is connected to PBXs of this branch office and other branch offices through the network. For example, a fixed-line telephone M belonging to the Beijing branch office needs to make a call to a fixed-line telephone N belonging to the Shanghai branch office, then the fixed-line telephone M firstly dials up the first code, the PBX of the Beijing branch office connects the fixed-line telephone M to the relay server through the PBX to which the fixed-line telephone M belongs according to the first code and receives a dial-up prompt tone returned by the relay server, and the prompt tone prompts that the calling fixed-line telephone M has been connected to the relay server and dial-up can be continuously carried out; then the fixed-line telephone M dials up the second code, the second code is a code representing the PBX in the Shanghai branch office to which the fixed-line telephone N belongs to, registered to the relay server, and the relay server identifies that the called fixed-line telephone N is a fixed-line telephone of the Shanghai branch office according to the second code dialed up by the fixed-line telephone M, and thus, the fixed-line telephone M is connected to the PBX in the Shanghai branch office; and finally, the fixed-line telephone M dials up the tail number of the telephone number of the called fixed-line telephone N, the PBX in the Shanghai branch office identifies out the called fixed-line telephone N according to the tail number of the fixed-line telephone N, so as to connect the fixed-line telephone M to the fixed-line telephone N, the fixed-line telephone N starts to ring, and after the fixed-line telephone N is put through, the one-to-one audio or video communication can be implemented between the fixed-line telephone M and the fixed-line telephone N.

Figure 3:
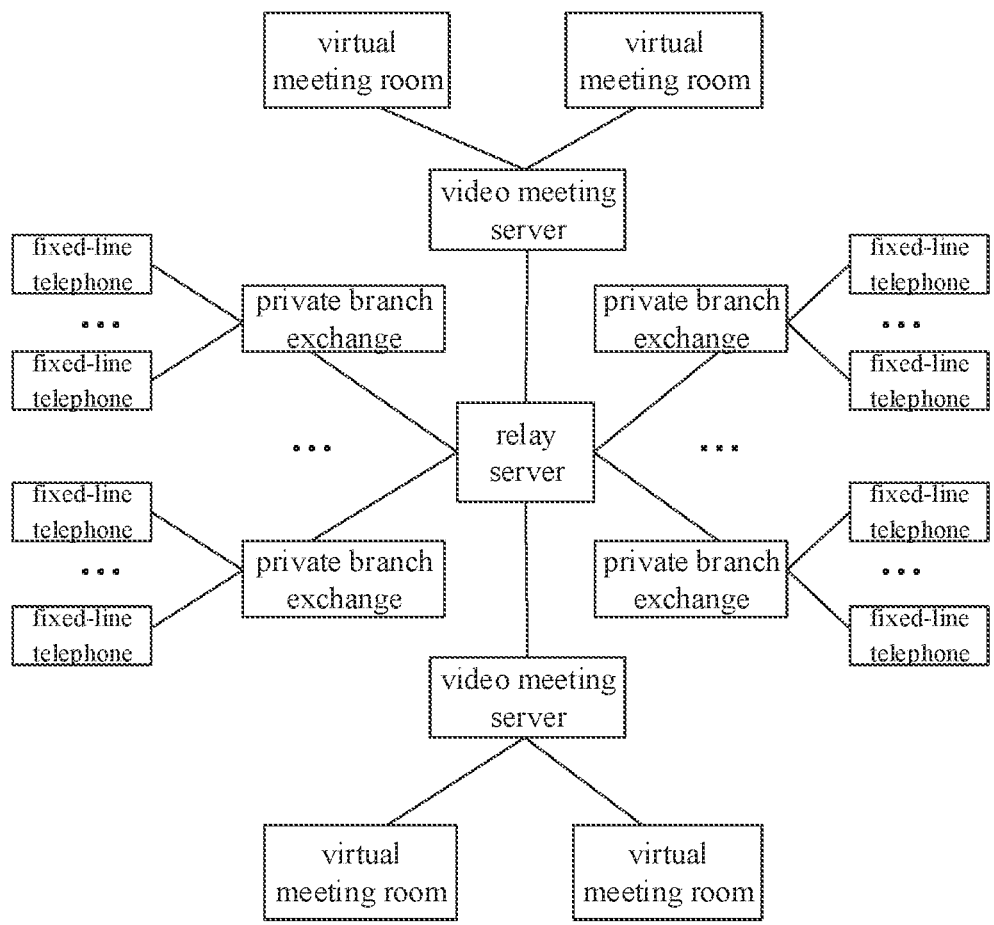
FIG. 3 is a block diagram of a communication system according to yet another embodiment of the present disclosure.

In some embodiments, as illustrated in FIG. 3, the communication nodes further include video meeting servers, a plurality of virtual meeting rooms connected to each video meeting server all can serve as called terminals, a terminal tail number of each called terminal is a meeting room number of the virtual meeting room, and the relay server utilizes the virtual meeting room to provide many-to-one meeting communication for the fixed-line telephones respectively belonging to different PBXs.

For example, on the basis of implementing cross-area one-to-one audio or video communication, generally, a cross-area multi-party audio or video conference is also required inside the enterprise so as to meet demands for communication inside the enterprise, and thus, the communication nodes also may include the video meeting servers, one or more video meeting servers are arranged in the communication system, each video meeting server can accommodate one or more virtual meeting rooms according to a bandwidth size, each virtual meeting room serves as the called terminal and exists in the communication system, and the virtual meeting room is registered to the video meeting server to which the virtual meeting room belongs (i.e., the video meeting server connected to the virtual meeting room) with the meeting room number, so that the video meeting server identifies the corresponding virtual meeting room according to the meeting room number.

For example, on a seminar inside an enterprise, workers in Beijing, Shanghai, Shenzhen and Chengdu need to carry out an audio or video meeting, and then the worker in each area carries out dial-up by using the respective fixed-line telephone according to information of an appointed virtual meeting room, so as to be connected to the specified virtual meeting room to implement the many-to-one meeting communication. For example, the called terminal is a virtual meeting room Y, the second code is a second code corresponding to the video meeting server to which the virtual meeting room Y belongs, and the terminal tail number is a meeting room number of the virtual meeting room Y. For example, the worker in Beijing dials up the first code by a video phone X to be connected to the relay server through the PBX to which the video phone X belongs, and receives a dial-up prompt tone returned by the relay server, and the prompt tone prompts that the video phone X has been connected to the relay server and dial-up can be continuously carried out; then the worker in Beijing dials up the second code, and the relay server identifies out a video meeting server which needs to be connected according to the second code and connects the video phone X to the video meeting server for carrying out the video meeting; and finally, the worker dials up the meeting room number of the virtual meeting room Y, and the video meeting server connects the video phone X to the virtual meeting room Y according to the meeting room number. At the same time, the workers in Shanghai, Shenzhen and Chengdu also connect video phones to the virtual meeting room Y by carrying out the dial-up operation, so as to implement the many-to-one meeting communication among different areas.

In some other embodiments, the first code may be set as a one-digit number code, i.e., each PBX sets the first code as a one-digit number, which represents the relay server when the relay server is registered to each PBX. For example, each PBX sets a number "1" as the first code, and then each fixed-line telephone in the communication system is connected to the relay server through the PBX to which the fixed-line telephone belongs by dialing up the number "1". It should be noted that in some embodiments of the present disclosure, a digit number of the first code may also be a random digit number such as 2, 3 and the like, a value of the first code may also be a random value, they can be determined according to actual demands, and the embodiments of the present disclosure are not limited thereto. The second code may be set as a two-digit number code, and for example, the PBX in Beijing is set as "11", the PBX in Shanghai is set as "12", the PBX in Shenzhen is set as "13" and the PBX in Chengdu is set as "14". When the calling fixed-line telephone in the communication system dials up the number "113", firstly, the calling fixed-line telephone is connected to the relay server through the PBX to which the calling fixed-line telephone belongs according to the first digit "1" in the number "113", the relay server identifies that the called terminal is a fixed-line telephone in Shenzhen according to the last two digits "13" in the number "113", and the relay server connects the calling fixed-line telephone to the PBX in Shenzhen. When the number of the communication nodes in the communication system is smaller than 9, the second code may also be set as a one-digit number code. It should be noted that in some embodiments of the present disclosure, a digit number and a value of the second code are also not limited and can be determined according to actual demands.

Similarly, in general, the terminal tail number is uniformly set as a three-digit or four-digit number code, and may also be set as a number code with any other digit numbers, and the specific digit number needs to be determined according to the number of the terminals included in the communication system. For example, the branch office in a certain area is relatively large in scale, more than 1,000 fixed-line telephones are arranged under the corresponding PBX, and in this case, the three-digit number code already cannot meet the demand for identifying all the fixed-line telephones, and thus, the four-digit number code needs to be used for carrying out identification, and then the entire communication system uses a four-digit tail number of the telephone number of each fixed-line telephone as the terminal number or uses a four-digit meeting room number as the terminal number of the virtual meeting room. Each terminal is registered to the PBX or the video meeting server to which the terminal belongs with the four-digit terminal tail number. Correspondingly, in a case where the number of the fixed-line telephones arranged under each PBX in the communication system is smaller than 1,000, the communication system can use a last-three-digit tail number of the telephone number of each fixed-line telephone as the terminal number, the specific setting may be determined according to a specific case, and the embodiments of the present disclosure are not limited thereto.

It should be noted that the communication system has excellent expandability, and due to the case that each communication node and the relay server constitute a star-shaped network where the relay server is the center, when one communication node is newly added, the relay server only needs to carry out the SIP routing registration with the newly added communication node, one routing link to the newly added communication node is added in the routing table, and the newly added communication node stores a routing link for connection to the relay server, thus the connection between the relay server and the newly added communication node can be implemented, so as to implement communication between each existing communication node in the communication system and the newly added communication node, thereby implementing capacity expansion of the communication system.

Figure 4:
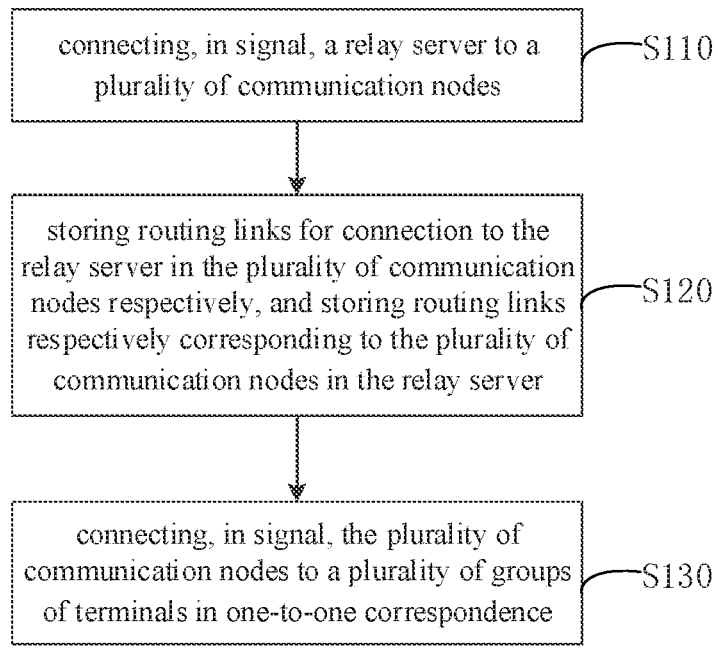
FIG. 4 is a flow chart of a construction method according to an embodiment of the present disclosure.

Corresponding to the communication system provided by the above-mentioned embodiments, at least one embodiment of the present disclosure further provides a construction method of a communication system, which can be used for constructing the communication system according to any one of the embodiments of the present disclosure. The communication system, for example, is based on the relay server and can be used for communication of the fixed-line telephones. The construction method provided by the embodiment of the present disclosure corresponds to the communication systems provided by the several embodiments above, and thus, the above-mentioned implementation mode is also applicable to the construction method provided by this embodiment, and is not described in detail in this embodiment. As illustrated in FIG. 4, the construction method of the communication system includes operations as follows:

Step S110: connecting, in signal (e.g., in network connection), a relay server to a plurality of communication nodes;

Step S120: storing routing links for connection to the relay server in the plurality of communication nodes respectively, and storing routing links respectively corresponding to the plurality of communication nodes in the relay server; and Step S130: connecting, in signal, the plurality of communication nodes to a plurality of groups of terminals in one-to-one correspondence, wherein each group in the plurality of groups of terminals includes at least one terminal.

For example, the construction method may further include: registering the relay server and the plurality of communication nodes with SIP routing. For example, the relay server can be registered to the plurality of communication nodes with a first code, and each of the plurality of communication nodes can be respectively registered to the relay server with a second code. For example, different communication nodes correspond to different second codes.

For example, the construction method may further include: registering each terminal in the plurality of groups of terminals to a communication node correspondingly connected to the terminal with a terminal tail number respectively. For example, different terminals correspond to different terminal tail numbers.

For example, the construction method may further include: respectively using terminals connected to different communication nodes as a calling terminal and a called terminal of the communication system. For example, the calling terminal implements communication with the called terminal by sequentially dialing up the first code, a second code corresponding to a communication node connected to the called terminal, and a terminal tail number corresponding to the called terminal.

For example, the relay server stores the routing links respectively corresponding to the plurality of communication nodes in a routing table of the relay server. When a communication node needs to be newly added, only one routing link to the newly added communication node needs to be added in the routing table, so as to facilitate capacity expansion of the system.

For example, the relay server and the plurality of communication nodes constitute a star-shaped network where the relay server is a center. The construction method can be used for constructing a cross-area communication system inside a large-sized enterprise so as to implement cross-area mutual communication. The method can simplify the cross-area communication dial-up operation, meanwhile, also effectively reduces communication cost of the enterprise, and has wide applicability and generalization performance.

Figure 5:
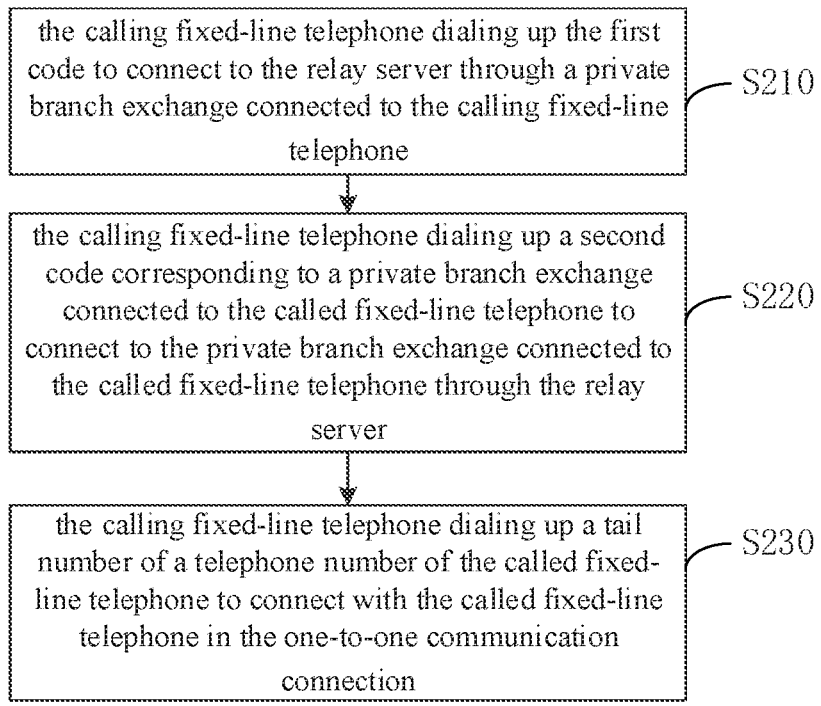
FIG. 5 is a flow chart of a communication method according to an embodiment of the present disclosure.

Corresponding to the above-mentioned communication system, at least one embodiment of the present disclosure further provides a communication method utilizing the above-mentioned communication system. The above-mentioned implementation mode is also applicable to the communication method provided by this embodiment, and is not described in detail in this embodiment. As illustrated in FIG. 5, the communication method is used for enabling fixed-line telephones connected to two different PBXs to carry out communication, the fixed-line telephones connected to two different PBXs include a calling fixed-line telephone and a called fixed-line telephone, and the communication method includes steps as follows:

Step S210: the calling fixed-line telephone dialing up the first code to connect to the relay server through a PBX connected to the calling fixed-line telephone;

Step S220: the calling fixed-line telephone dialing up a second code corresponding to a PBX connected to the called fixed-line telephone to connect to the PBX connected to the called fixed-line telephone through the relay server; and Step S230: the calling fixed-line telephone dialing up a tail number of a telephone number of the called fixed-line telephone to connect with the called fixed-line telephone in the one-to-one communication connection.

Figure 6:
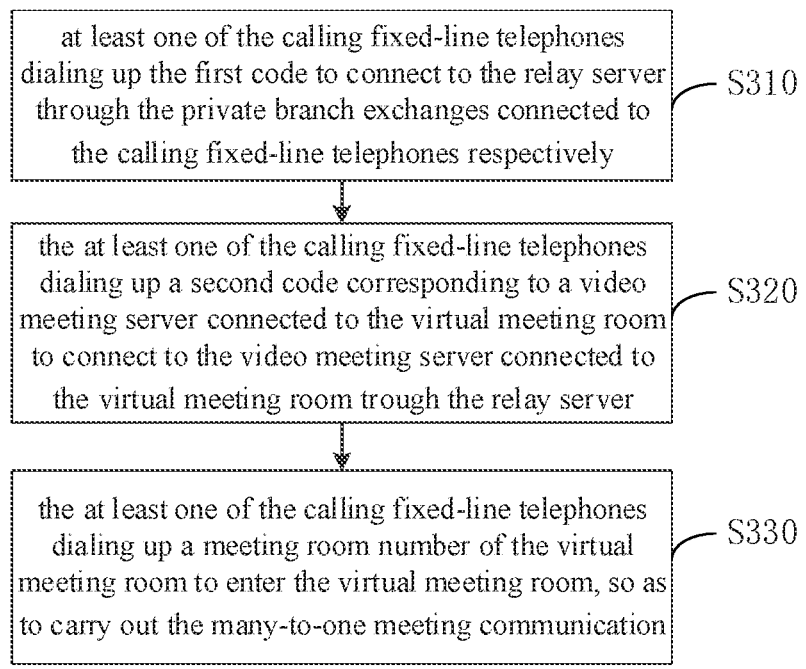
FIG. 6 is a flow chart of a communication method according to another embodiment of the present disclosure.

At least one embodiment of the present disclosure further provides a communication method utilizing the above-mentioned communication system, as illustrated in FIG. 6, the communication method is used for enabling fixed-line telephones serving as calling fixed-line telephones and connected to different PBXs to carry out communication with the virtual meeting room serving as the called terminal, and the communication method includes steps as follows:

Step S310: at least one (for example, each) of the calling fixed-line telephones dialing up the first code to connect to the relay server through the PBX connected to the calling fixed-line telephones respectively;

Step S320: the at least one (for example, each) of the calling fixed-line telephones dialing up a second code corresponding to a video meeting server connected to the virtual meeting room to connect to the video meeting server connected to the virtual meeting room through the relay server; and Step S330: the at least one (for example, each) of the calling fixed-line telephones dialing up a meeting room number of the virtual meeting room to enter the virtual meeting room, so as to carry out the many-to-one meeting communication.

For an audio or video meeting which specifies a virtual meeting room in advance, workers can directly enter the virtual meeting room by audio or video phones, to carry out the audio or video meeting. However, the video meeting server also has limitation to capacity, and the number of the video meeting servers inside an enterprise also may be set according to actual demands, and thus, in some embodiments, before the communication is carried out, the communication method further includes: querying whether at least one video meeting server still has a virtual meeting room that is available according to preplanned meeting time, if yes, reserving the virtual meeting room that is available and returning reservation information, and if no, randomly selecting one video meeting server and, by the one video meeting server that is selected, allocating one virtual meeting room and returning the reservation information. For example, the reservation information includes a second code corresponding to the video meeting server connected to the virtual meeting room and a meeting room number of the virtual meeting room. Namely, before the many-to-one meeting communication is carried out, the communication method further includes: reserving the virtual meeting room, i.e., firstly, querying a service condition of at least one (for example, each) video meeting server according to the preset meeting time to determine whether the virtual meeting room which is available exists during the meeting time, if yes, directly carrying out reservation and returning the reservation information, and if no, randomly selecting one video meeting server by the worker who reserves the meeting, and by the one video meeting server, allocating the virtual meeting room and returning the reservation information. For example, the video meeting server that is randomly selected can allocate an available virtual meeting room which is closest to the preset meeting time from the virtual meeting rooms connected to the video meeting server that is randomly selected. The reservation information includes meeting time when the virtual meeting room serves, the second code corresponding to the video meeting server to which the virtual meeting room belongs, and the meeting room number of the virtual meeting room, and the reservation information can be sent to all participants, so that each participant can use the second code and the meeting room number to enter the virtual meeting room according to the meeting time to have a meeting.

In order to avoid no virtual meeting room that is available when reserving the meeting room, generally, an advanced reservation is adopted so as to reserve the virtual meeting room having proper service time. However, in a case of a relatively emergency meeting or a meeting caused by an emergency situation, in some other embodiments of the present disclosure, when there is no virtual meeting room that is available corresponding to the preplanned meeting time, the communication method further includes: searching a virtual meeting room that is available and is closest to the meeting time from at least one video meeting server, and reserving the virtual meeting room and returning the reservation information. Namely, the virtual meeting room that is available and is closest to the meeting time and can be arranged by any video meeting server is queried, the queried available virtual meeting rooms are sorted according to time when the virtual meeting rooms are available, and the virtual meeting room that is available and is closest to the meeting time is selected to carry out reservation, so as to further improve reservation efficiency.

According to the embodiments of the present disclosure, for the case that a long number needs to be dialed up in the process of carrying out cross-geographical-area communication by the fixed-line telephones inside the enterprise currently and the problem of relatively high enterprise communication cost caused by the communication mode, in the communication system for the fixed-line telephones, which is based on the relay server, the construction method and the communication method, the relay server is arranged between the PBXs and the video meeting servers in each area and the star-shaped network is carried out by taking the relay server as the center to form the communication system, a two-time code dial-up mode is constructed by the SIP routing registration and a registration mode of the first code and the second code, so as to implement a mode of using the fixed-line telephones to carry out short number communication inside the enterprise by the communication system among each area, a flexible system capacity expansion solution is also provided, and communication cost is obviously reduced.

Obviously, the foregoing embodiments merely are examples for clearly illustrating the disclosure, but not intended to define the embodiments of the disclosure. Those skilled in the art also can make other different forms of variations or changes on the basis of the illustration above. All embodiments do not need to, and also cannot, be exhausted herein. The apparent variations or changes made on the basis of the technical solutions of the present disclosure are still within the scope of the present disclosure.

The above merely are specific embodiments of the disclosure, and not intended to define the scope of the disclosure, and the scope of the disclosure is determined by the scope of the appended claims.

What is claimed is:

1. A communication system, comprising a relay server and a plurality of communication nodes;
   wherein the relay server is in signal connection with the plurality of communication nodes, each of the plurality of communication nodes stores a routing link for connection to the relay server, and the relay server stores routing links respectively corresponding to the plurality of communication nodes;
   the plurality of communication nodes are in signal connection with a plurality of groups of terminals in one-to-one correspondence;
   the relay server provides communication connections for terminals connected to different communication nodes;
   the communication system further comprises the plurality of groups of terminals,
   each group in the plurality of groups of terminals comprises at least one terminal;
   the relay server and the plurality of communication nodes are registered with session initiation protocol routing;
   the relay server is registered to the plurality of communication nodes with a first code,
   each of the plurality of communication nodes is respectively registered to the relay server with a second code, different communication nodes correspond to different second codes,
   each terminal in the plurality of groups of terminals is respectively registered to a communication node correspondingly connected to the terminal with a terminal tail number and different terminals correspond to different terminal tail numbers;
   the plurality of groups of terminals comprise a first terminal and a second terminal, which are respectively connected to different communication nodes,
   the first terminal serves as a calling terminal, and the second terminal serves as a called terminal, or the first terminal serves as the called terminal, and the second terminal serves as the calling terminal, and
   the calling terminal communicates with the called terminal by sequentially dialing up the first code, a second code corresponding to a communication node connected to the called terminal, and a terminal tail number of the called terminal;
   the communication nodes comprise private branch exchanges, the terminals comprise fixed-line telephones, each of the fixed-line telephones is capable of serving as the calling terminal or the called terminal, terminal tail numbers corresponding to the fixed-line telephones are tail numbers of telephone numbers of the fixed-line telephones, and the relay server provides a one-to-one communication connection for fixed-line telephones connected to two different private branch exchanges;

the communication nodes further comprise video meeting servers, the terminals further comprise virtual meeting moms, the virtual meeting moms are in signal connection with the video meeting servers, each of the virtual meeting rooms is capable of serving as the called terminal, terminal tail numbers corresponding to the virtual meeting moms are meeting room numbers of the virtual meeting rooms, and the relay server provides a many-to-one meeting communication for fixed-line telephones connected to different private branch exchanges, utilizing the virtual meeting moms.

2. The communication system according to claim 1, wherein the relay server is connected to the plurality of communication nodes through a network.

3. The communication system according to claim 1, wherein the relay server stores the routing links respectively corresponding to the plurality of communication nodes in a muting table of the relay server.

4. The communication system according to claim 1, wherein a digit number of the terminal tail number is determined according to a number of terminals which the plurality of groups of terminals comprise.

5. A communication method utilizing the communication system according to claim 1, wherein the communication method is used for enabling fixed-line telephones used as calling fixed-line telephones and connected to different private branch exchanges to carry out communication with a virtual meeting room used as the called terminal, and the communication method comprises:

at least one of the calling fixed-line telephones dialing up the first code to connect to the relay server through the private branch exchanges connected to the calling fixed-line telephones respectively;

the at least one of the calling fixed-line telephones dialing up a second code corresponding to a video meeting server connected to the virtual meeting room to connect to the video meeting server connected to the virtual meeting room trough the relay server; and the at least one of the calling fixed-line telephones dialing up a meeting mom number of the virtual meeting room to enter the virtual meeting room, so as to carry out the many-to-one meeting communication.

6. The communication method according to claim 5, wherein, before the communication is carried out, the communication method further comprises:

querying whether at least one video meeting server still has a virtual meeting room that is available according to preplanned meeting time, if yes, reserving the virtual meeting room that is available and returning reservation information, and if no, randomly selecting one video meeting server and, by the one video meeting server that is selected, allocating one virtual meeting room and returning the reservation information;

wherein the reservation information comprises a second code corresponding to the video meting server connected to the virtual meeting room and a meeting room number of the virtual meeting room.

7. The communication method according to claim 6, wherein, in a case where there is no virtual meeting room that is available corresponding to the meeting time, the communication method further comprises:

searching a virtual meeting room that is available and is closest to the meeting time from at least one video meeting server, and reserving the virtual meeting room and returning the reservation information.

* * * * *